United States Patent
Yamamoto et al.

(10) Patent No.: US 7,763,387 B2
(45) Date of Patent: Jul. 27, 2010

(54) NEGATIVE ELECTRODE FOR SECONDARY CELL AND SECONDARY CELL USING THE SAME

(75) Inventors: Hironori Yamamoto, Tokyo (JP); Yutaka Bannai, Tokyo (JP); Mariko Miyachi, Tokyo (JP); Jiro Iriyama, Tokyo (JP); Hidemasa Kawai, Tokyo (JP); Masato Shirakata, Tokyo (JP)

(73) Assignee: NEC Corporation, Tokyo (JP)

( * ) Notice: Subject to any disclaimer, the term of this patent is extended or adjusted under 35 U.S.C. 154(b) by 1453 days.

(21) Appl. No.: 10/512,139

(22) PCT Filed: May 22, 2003

(86) PCT No.: PCT/JP03/06374

§ 371 (c)(1),
(2), (4) Date: Dec. 30, 2004

(87) PCT Pub. No.: WO03/100888

PCT Pub. Date: Dec. 4, 2003

(65) Prior Publication Data

US 2005/0084758 A1    Apr. 21, 2005

(30) Foreign Application Priority Data

May 24, 2002    (JP) ............................. 2002-151035

(51) Int. Cl.
H01M 4/38    (2006.01)
H01M 4/48    (2010.01)

(52) U.S. Cl. .................................. 429/231.8; 429/221

(58) Field of Classification Search ....................... None
See application file for complete search history.

(56) References Cited

U.S. PATENT DOCUMENTS 6,733,922 B2 * 5/2004 Matsubara et al. ........ 429/231.8
7,118,831 B2 * 10/2006 Bannai et al. .......... 429/231.95

FOREIGN PATENT DOCUMENTS

| JP | 8-329929 | 12/1996 |
|---|---|---|
| JP | 9-259868 | 10/1997 |
| JP | 2000-182671 | 6/2000 |
| JP | 2000-215887 | 8/2000 |
| JP | 2000-311681 | 11/2000 |
| JP | 2001-68112 | 3/2001 |

(Continued)

OTHER PUBLICATIONS

Japanese Office Action dated Jun. 19, 2009 with Partial English Translation.

*Primary Examiner*—John S Maples
(74) *Attorney, Agent, or Firm*—McGinn Intellectual Property Law Group, PLLC

(57) ABSTRACT

Since a first layer (a carbon layer 2a) whose chief ingredient is carbon and a second layer (Li absorbing layer 3a) containing particles having a theoretical capacity greater than that of graphite are formed on anode collector 1a, high capacity and high operation voltage can be realized. Since a element having a theoretical capacity equal to or less than that of graphite is added to the particles constituting this second layer, expansion and contraction of volume according to the charge and discharge are suppressed. This enables capacity deterioration to be suppressed even though cycles go on.

19 Claims, 6 Drawing Sheets

FOREIGN PATENT DOCUMENTS

| | | |
|---|---|---|
| JP | 2001-76719 | 3/2001 |
| JP | 2001-243946 | 9/2001 |
| JP | 2001-313032 | 11/2001 |
| JP | 2002-008652 | 1/2002 |
| JP | 2002-15729 | 1/2002 |
| JP | 2002-141069 | 5/2002 |
| JP | 2003-115293 | 4/2003 |
| JP | 2003-217574 | 7/2003 |

* cited by examiner

NEGATIVE ELECTRODE FOR SECONDARY CELL AND SECONDARY CELL USING THE SAME

This application is based on PCT/JP03/06374, filed on 22 May 2003, which claims priority of Japanese 2002-151035, filed 24 May 2002.

TECHNICAL FIELD

The present invention relates to an anode for a secondary battery and a secondary battery.

BACKGROUND ART

Because of the popularization of a mobile terminal such as a cell phone, a laptop PC (personal computer) and the like, the role of a battery has been important as its power source. This battery requires the features that it has small size, lightweight and a high capacity and it is not easily deteriorated even if charge and discharge are repeated. A lithium secondary battery is optimal for the above-mentioned application because of its high operation voltage and high energy density. In the lithium secondary battery, as a cathode material, the material whose chief ingredient is $LiCoO_2$ or manganese spinel is mainly used, and as an anode material, a carbon material such as graphite is typically used. In recent years, these materials are used to obtain the performance substantially close to the theoretical capacity (372 mAh/g in the case of the graphite). In order to make the energy density higher, the material that has high theoretical discharge capacity is used to try various ideas.

For example, a conventional technique, disclosed in Japanese Laid Open Patent Application JP-A 2000-215887, tries to cover the surfaces of metal particles with carbon layer and use the particle as the anode material in order to attain the properties of a high capacity and a high cycle, the metal particles can form a lithium alloy.

Also, a conventional technique, disclosed in Japanese Laid Open Patent Application JP-A-Heisei 9-259868, adds aluminum, lead and silver with small particle diameters to the carbon material as the charge and discharge assistant of lithium ions in order to attain the higher capacity.

However, the techniques disclosed in the above-mentioned gazettes have the following problems.

Firstly, the sufficiently high operation voltage cannot be attained. If the anode is manufactured by using metal particles such as Si and the like as the chief ingredient, the operation voltage is strongly influenced by the plateau at the high potential unique to the metal. This leads to the drop in the operation voltage of the battery.

Secondly, since a homogeneous electric field strength cannot be obtained between the cathode and anode, the sufficiently stable operation cannot be obtained. If the particles of Li absorption metal are added to the carbon so that they are interspersed inside the electrode, the inhomogeneous resistance and Li absorption amount of those sections bring about the inhomogeneous application voltage and current amount, which causes the peeling and the like.

Thirdly, the deterioration in the capacity is severe in association with the cycle. The Li absorption metal is larger in capacity and greater in volume change than the carbon, in association with the charge and discharge. Thus, the electric contact between the Li absorption metal and the carbon particles is reduced with the cycle, and the Li absorption metal cannot contribute to the charge and discharge.

In relation to the above-mentioned description, a non-aqueous secondary battery is disclosed in Japanese Laid Open Patent Application JP-A 2000-182671. This non-aqueous secondary battery in the conventional art has: a sheet (an anode sheet) including the anode material that can absorb and discharge the lithium; a sheet (a cahode sheet) including a cathode electrode active material; and a non-aqueous electrolyte. The cathode active material is the metallic oxide or metallic sulfide which includes at least one kind of an atom selected from vanadium, copper, iron, titanium, molybdenum and chrome and does not include the lithium contributing to the charge and discharge preliminarily and substantially. The metallic foil which mainly includes the lithium is preliminarily stuck to the anode sheet. Also, the non-aqueous electrolyte is the gel electrolyte including organic polymer, aprotic solvent and ammonium salt or alkali metal or alkali-earth metal salt. The metallic foil mainly containing the lithium is stuck on the combination layer of the anode sheet on which the anode material is coated. Or, it is stuck on the anode collector metal on the surface which is not faced to the cathode sheet. The anode sheet is configured as the multi-layer which has: the layer mainly containing the anode material that can absorb and discharge the lithium; and the assistant layer containing the insoluble particles of at least one layer.

Also, a secondary battery is disclosed in Japanese Laid Open Patent Application JP-A 2000-311681. The anode material of this conventional lithium secondary battery includes the particles whose chief ingredient is the amorphous Sn–A–X alloy with non-stoichiometric ratio composition. In the above-mentioned equation, the A indicates at least one kind of a transition metal, and the X indicates at least one kind selected from a group consisting of O, F, N, Mg, Ba, Sr, Ca, La, Ce, Si, Ge, C, P, B, Bi, Sb, Al, In, S, Se, Te and Zn. Here, the X may not be included. Also, in the atom number in the respective atoms in the above-mentioned equation, there is the relation of $Sn/(Sn+A+X)=20\sim80$ atom %.

A non-aqueous electrolyte secondary battery is disclosed in Japanese Laid Open Patent Application JP-A 2001-68112. The anode active material for the non-aqueous electrolyte secondary battery in this conventional art is composed of the particles having three phases or more with regard to material organization, and at least two phases are the phase that absorbs the lithium, and at least one phase is the phase that does not absorb the lithium. The two phases absorbing the lithium have the composition represented by an equation M1αM2 ($0 \leq \alpha < 3$) and M3αM4 ($\alpha < a$), and the phase that does not absorb is represented by M5. The M1 and the M3 are at least one kind of an element selected from a group consisting of Na, K, Rb, Cs, Ce, Ti, Zr, Hf, V, Nb, Ta, Ca, Sr, Ba, Y, La, Cr, Mo, W, Mn, Tc, Ru, Os, Co, Rh, Ir, Ni, Pd, Cu, Ag and Fe, the M2 and the M4 are at least one kind of an element selected from a group consisting of Al, Ga, In, Si, Ge, Sn, Pb, Sb and Bi, and the M5 is a simplex or compound that is $x \leq 0.05$ when the composition at the time of the Li absorption is represented by an equation $Li_xM5$.

Also, a non-aqueous electrolyte secondary battery is disclosed in Japanese Laid Open Patent Application JP-A 2001-76719. The anode material for the non-aqueous electrolyte secondary battery in this conventional art, is represented by the equation (1): $M1_aM2$, and all or a part of the surface of the particle having the A-phase of the composition satisfying $0 \leq a \leq 5$ is represented by the equation (2): $M1'_bM2'_c$, and it is covered with the B-phase of the composition satisfying c=1 or c=0, here, if c=1 then a<b. The M1 and the M1' are elements selected from an (m1) group consisting of Na, K, Rb, Cs, Ce, Ti, Zr, Hf, V, Nb, Ta, Ca, Sr, Ba, Y, La, Cr, Mo, W, Mn, Tc, Ru, Os, Co, Rh, Ir, Ni, Pd, Cu, Ag and Fe, and the M2 and the M2' are the elements selected from an (m2) group composed of Al, Ga, In, Si, Ge, Sn, Pb, Sb and Bi. Then, 50% or more of the surface of the particle having the A-phase is covered with the B-phase. The concentration of at least one kind of the element selected from the (m1) group is being reduced gradually from the surface to the inside.

Also, a non-aqueous electrolyte secondary battery is disclosed in Japanese Laid Open Patent Application JP-A 2001-243946. In the non-aqueous electrolyte secondary battery in this conventional art, the anode includes the anode material composed of composite particles in which the whole or part of the circumferential surface of the nuclear particle consisting of a solid phase A is covered with a solid phase B. The solid phase A includes at least one of silicon, tin and zinc as the configuration element, and the solid phase B is composed of solid solution or inter-metal compound of any of the silicon, the tin and the zinc which are the configuration elements of the solid phase A and at least one kind of the element (however, except for the configuration elements of the solid phase A and the carbon) selected from a group consisting of a group II element, a transition element, a group XII element, a group XIII element and a group XIV element in a periodic table, and the composite particle includes ceramic. The ceramic is made of at least one kind or more selected from a group consisting of SiC, $Si_3N_4$, $Al_2O_3$, TiC, $TiB_2$, $V_2O_3$, $ZrB_2$, $HfB_2$, $ZrO_2$, ZnO, WC and $W_2C$.

DISCLOSURE OF THE INVENTION

Therefore, an object of the present invention is to provide an anode for a secondary battery which has a high operation voltage, a stable operation and a long life, and a secondary battery using the same.

In the viewpoint of the present invention, the anode for the secondary battery has the anode active material layer that can absorb and discharge lithium ions, and the anode active material layer has a first layer whose chief ingredient is carbon, and a second layer. The second layer includes at least one first element having a theoretical capacity larger than that of a graphite and at least one second element having a theoretical capacity equal to or less than the theoretical capacity of the graphite.

Here, the second layer includes particles, and the particles include the first element and the second element. In the particles, the surface of the particles having the first element may be coated with the second element, and the surface of the particles having the second element may be coated with the first element.

Preferably, the particles are formed by any method of a CVD method, a deposition method, a sputtering method, a mechanical milling method and a mechanical alloy method.

In this case, preferably, the first element is at least one element selected from a group consisting of Si, Ge, Sn, Al, Pb, Pd, Ag, In and Cd, and preferably, the second element is at least one element selected from a group consisting of C, Fe and Cu.

The anode for the secondary battery may further include a layer composed of Li or Li compound. Preferably, the Li compound includes LiF or $Li_2O$.

The anode for the secondary battery may further include a layer having a lithium ion conductive property. The layer having the lithium ion conductve property may be formed between the first layer and the layer composed of the Li or Li compound. In this case, the layer with the lithium ion conductive property is preferably composed of the materials selected from a group consisting of: Si, Sn, DLC, $Li_2O$—$SiO_2$ based compound, $Li_2O$—$B_2O_3$—$SiO_2$ based compound, $Li_2O$—$B_2O_3$—$P_2O_5$ based compound, $Li_2O$—$WO_3$ based compound, $Li_2O$—$P_2O_5$—$SiO_2$ based compound, and $Li_2O$—$B_2O_3$ based compound.

Also, preferably, a volume A of the first element and a volume B of the second element satisfy $0.001 \leq B/(A+B) \leq 0.5$.

The anode for the secondary battery may further include a collector, and it is preferably placed adjacently to the first layer. The collector may be placed adjacently to the second layer.

In another viewpoint of the present invention, the secondary battery includes: the anode for the secondary battery; the cathode that can absorb and discharge the lithium ions; and the electrolyte placed between the anode for the secondary battery and the cathode.

BEST MODE FOR CARRYING OUT THE INVENTION

The secondary battery of the present invention will be described below in detail with reference to the attached drawings.

First Embodiment

Figure 1:
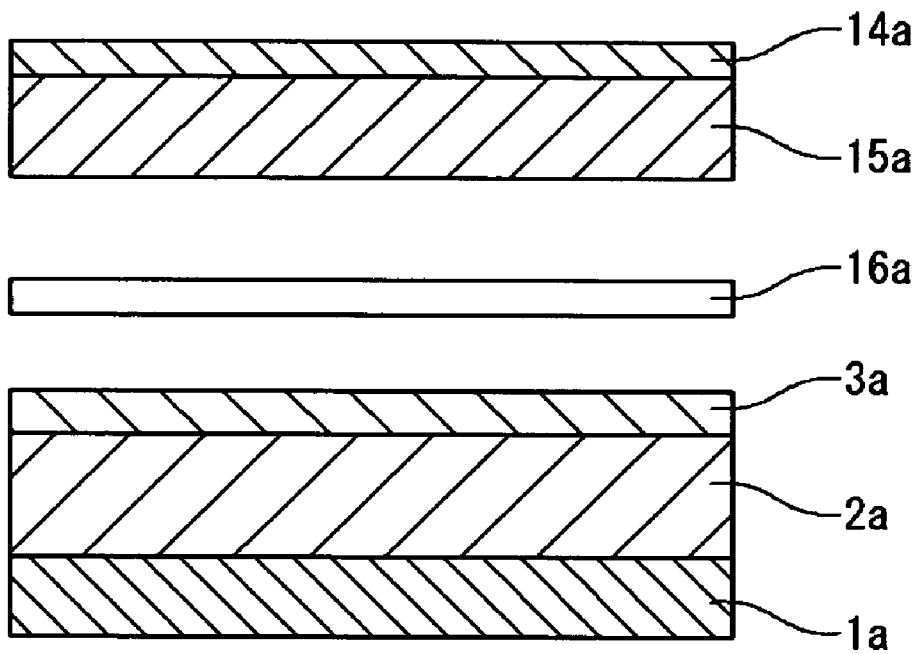
FIG. 1 is a sectional view showing a section of a secondary battery according to the first embodiment of the present invention.

FIG. 1 is a sectional view showing a section of a secondary battery according to the first embodiment of the present invention. With reference to FIG. 1, an anode collector 1*a* and a cathode collector 14*a* are the electrodes for passing electric currents from outside in a battery and removing electric currents from a battery to outside at a time of charge and discharge. The anode collector 1*a* is the conductive metallic foil, which is exemplified in aluminum, copper, stainless steel, gold, tungsten, molybdenum and the like. Also, the thicknesses of the anode collector 1*a* and the cathode collector 14*a* can be set to, for example, 5 to 25 μm.

A carbon layer 2a corresponding to the first layer, which is formed on the anode collector 1a, is an anode material for absorbing and discharging the lithium in the charge and discharge. As the materials of this carbon layer 2a, the carbon materials can be listed, for example, graphite, fullerene, carbon nano-tube, DLC (Diamond-Like Carbon), amorphous carbon, hard carbon and the like. Also, it is possible to use those in which two or more kinds of the above-mentioned materials are mixed.

A Li absorbing layer 3a corresponding to a second layer, which is formed on the carbon layer 2a, is an anode material for absorbing or discharging the lithium in the charge and discharge, and has a Li absorption amount which is greater than a carbon theoretical capacity 372 mAh/g. This anode material is composed of the following two materials.

(i) The Li absorbing material containing at least one or more kinds of elements selected from a group composed of Si, Ge, Sn, Al, Pb, Pd, Ag, In and Cd.

(ii) The buffering material composed of element(s) having a capacity equal to or less than 372 mAh/g such as carbon, Fe, Cu and the like, or element(s) which does not absorb the Li.

Figure 2:
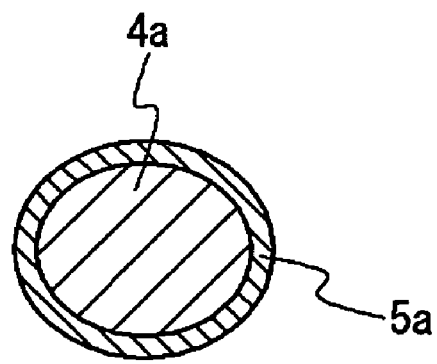
FIG. 2 is a sectional view showing a section of an example of a particle constituting a Li absorbing layer of the present invention.
Figure 3:
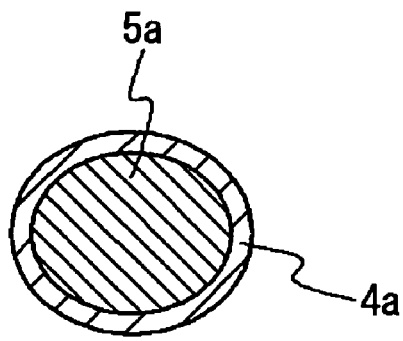
FIG. 3 is a sectional view showing a section of another example of a particle constituting a Li absorbing layer of the present invention.
Figure 12:
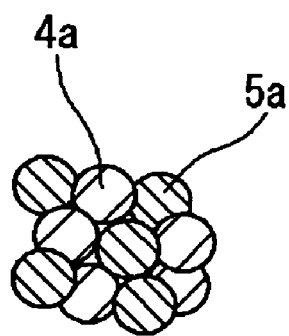
FIG. 12 is a schematic view showing another example of a particle constituting a Li absorbing layer of the present invention.

Also, as the Li absorbing material, it is possible to list the compound which includes Si, Ge, Sn, Al, Pb, Pd, Ag, In and Cd, for example, alloy, oxide and the like. Also, the anode material constituting the Li absorbing layer 3a may be the particles having the structure, as shown in FIG. 2, that the surface of a Li absorbing material 4a is covered with a buffering material 5a, or, as shown in FIG. 3, that the surface of the buffering material 5a is covered with the Li absorbing material 4a. Also, as shown in FIG. 12, it is possible to use the particles that the Li absorbing material and the buffering material are mixed. When these particles are manufactured, the covering process may be carried out by using a vapor phase growth method, a deposition method, a sputtering method and the like, or, a milling of an alloy material and a synthesizing method of a mechanical alloy can be used. In the particles shown in FIGS. 2, 3 and 12, the existence of the buffering material 5a suppresses the expansion and contraction of the volume in association with the charge and discharge of the Li absorbing material 4a.

The carbon layer 2a and the Li absorbing layer 3a can be manufactured by coating the material, in which a conductive material such as carbon black and a binder such as poly-vinylidene fluoride (PVDF) are mixed so as to be dispersed in the solvent such as N-methyl-2-pyrrolidone (NMP), on the anode collector 1a by using a doctor blade method, a spray coating method or the like, respectively.

On the other hand, a cathode active material 15a is exemplified in, $LiCoO_2$, $Li_xCo_{1-y}M_yO_2$, $Li_2NiO_2$, $Li_xMnO_2$, $Li_xMnF_2$, $Li_xMnS_2$, $Li_xMn_{1-y}M_yO_2$, $Li_xMn_{1-y}M_yO_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_{2-y}M_yO_4$, $Li_xMn_{2-y}M_yO_{4-z}F_z$ and $Li_xMn_{2-y}M_yO_{4-z}S_z$ ($0<x\leq1.5$, $0y<1.0$, $z\leq1.0$, and the M indicates at least one or more of transition metals) and the like. The thickness of the cathode active material 15a can be set to, for example, 10 to 500 μm. The cathode active material 15a can be manufactured by coating the material, in which the conductive material such as the carbon black and the binder such as the poly-vinylidene fluoride (PVDF) are mixed so as to be dispersed in the solvent such as the N-methyl-2-pyrrolidone (NMP), on the cathode collector, similarly to the carbon layer 2a and the Li absorbing layer 3a.

A separator 16a, which has insulative property and ion-conductive property, is placed between the anode and the cathode. As the separator 16a, for example, it is possible to use: polyolefin such as polypropylene and polyethylene; and porous film such as fluorocarbon resin. The cahode, the separator and the anode are laminated. Or, after the laminated structure is winded, it is accommodated in a battery can. In this case, the battery can be manufactured by sealing with the flexible film composed of the laminated unit made of synthetic resin and metallic foil.

Also, as the electrolyte, the cyclic carbonate type such as propylene carbonate (PC), ethylene carbonate (EC), butylene carbonate (BC), vinylene carbonate (VC), the chain carbonate type such as dimethyl carbonate (DMC), diethyl carbonate (DEC), ethyl methyl carbonate (EMC), dipropylene carbonate (DPC)., the aliphatic carboxylate type such as methyl formate, methyl acetate, ethyl propionate, the γ-lactone type such as γ-butyrolactorne, the chain ether type such as 1,2-ethoxy-ethane (DEE), ethoxy-methoxy ethane (EME), the cyclic ether type such as tetra-hydro-furan, 2-methyl-tetra-hydro-furan, and the aprotic organic solvent such as di-methyl sulfoxide, 1,3-dioxysolan, formamide, acetamide, dim-ethyl-formamide, diolysolan, aceto-nitrile, propyl-nitrile, nitro-methane, ethyl-mono-glime, tri-ester phosphate, tri-methoxy-methane, dioxysolan-derivative, sulfolane, methyl-sulfolane, 1,3-dimethyl-2-imidazolyzinon, 3-methyl-2-ox-azolezinon, propylene carbonate derivative, tetra-hydro-furan derivative, ethyl ether, 1,3-propane-salton, anisole, N-methyl pyrrolidone are used. One or more two kinds of these organic solvents are mixed and used, and the lithium salt is dissolved into those organic solvents.

Also, as the lithium salt, for example, $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, lower aliphatic carboxylic lithium, chloro-borane lithium, 4-phenyl boric lithium, LiBr, LiI, LiSCN, LiCl, imide type are listed. Also, polymer electrolyte may be used instead of the electrolyte.

The operation of the anode for the secondary battery shown in FIG. 1 will be described below in detail.

At the time of the charge, the anode receives the lithium ions through the electrolyte from the cathode side. At first, the lithium ions are bound to the Li absorbing layer 3a placed on the surface of the anode, and then form the lithium compound. At this time, since the material having the small Li absorption amount property or the element having no Li absorbing performance is added to the particles forming the Li absorbing layer 3a, the volume expansion of the particles in association with the charge is suppressed. Next, the lithium ions are absorbed into the carbon layer 2a. When it is ended, the charge is completed. At the time of the discharge, the lithium ions absorbed at the time of the charge are discharged from the carbon layer 2a, contrarily to the above-mentioned case. Next, the lithium ions absorbed in the Li absorbing layer 3a are gradually discharged without any evident plateau. Thus, it is possible to obtain the high operation voltage. The lithium ions discharged from the anode are moved through the electrolyte to the cathode.

Second Embodiment

Figure 5:
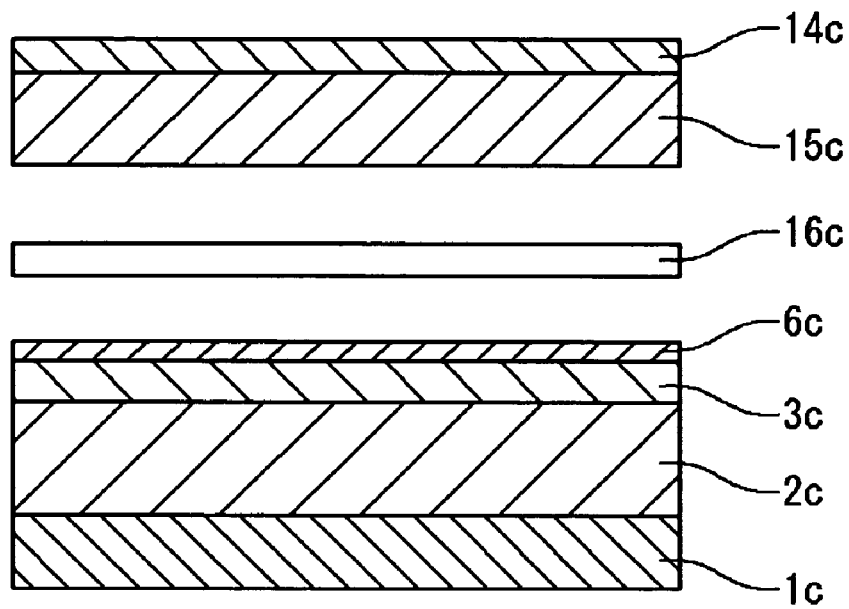
FIG. 5 is a sectional view showing the section of the secondary battery according to the second embodiment.

A secondary battery according to a second embodiment of the present invention will be described in detail with reference to the drawings. FIG. 5 is a sectional view showing the section of the secondary battery according to this embodiment.

With reference to FIG. 5, the secondary battery has an anode collector 1c, a carbon layer 2c, a Li absorbing layer 3c, a Li compensating layer 6c, a cathode collector 14c, a cathode active material 15c and a separator 16c. The anode collector 1c, the carbon layer 2c, the Li absorbing layer 3c, the cathode collector 14c, the cathode active material 15c, the separator 16c and the electrolyte can be configured respectively similarly to the anode collector 1a, the carbon layer 2a, the Li absorbing layer 3a, the cathode collector 14a, the cathode active material 15a, the separator 16a and the electrolyte in the first embodiment.

The Li compensating layer 6c corresponding to the layer composed of the Li or Li compound is placed in order to compensate the irreversible capacity existing inside the battery. It can be manufactured by depositing or sticking the metallic Li or Li compound.

After the cathode, the separator and the anode are laminated or after the material in which they are laminated is winded, it is accommodated in a battery can and sealed with the flexible film composed of the laminated unit of synthetic resin and metallic foil, the battery can be manufactured.

The operation of the anode in the secondary battery shown in FIG. 5 will be described below in detail.

At the time of the charge, the anode receives the lithium ions through the electrolyte from the cathode side. The lithium ions are supplied from the cathode and the Li compensating layer 6c to the inside of the anode, and firstly bound to the Li absorbing layer 3c on the surface of the anode, and then form the lithium compound. At this time, since the material having the small Li absorption amount property or the element having no Li absorbing performance is added to the particles forming the Li absorbing layer 3c, the volume expansion of this particles in association with the charge is suppressed. Next, the lithium ions are absorbed into the carbon layer 2c. When it is ended, the charge is completed. At the time of the discharge, the lithium ions absorbed at the time of the charge are discharged from the carbon layer 2c, contrarily to the above-mentioned case. Next, the lithium ions absorbed in the Li absorbing layer 3c are gradually discharged without any evident plateau. Thus, it is possible to obtain the high average operation voltage. The lithium ions discharged from the anode are moved through the electrolyte to the cathode.

In the battery of this embodiment, the Li compensating layer 6c enables the compensating of the lithium corresponding to the irreversible capacity. Thus, the charge and discharge efficiency can be made very high.

Third Embodiment

Figure 7:
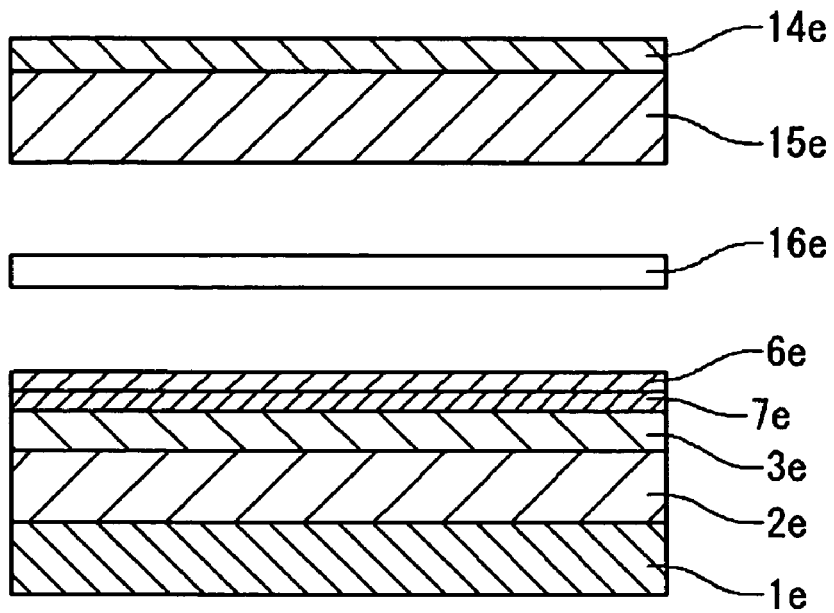
FIG. 7 is a sectional view showing a section of the secondary battery according to the third embodiment.

A secondary battery according to a third embodiment of the present invention will be described in detail with reference to the drawings. FIG. 7 is a sectional view showing a section of the secondary battery according to this embodiment.

With reference to FIG. 7, the secondary battery has an anode collector 1e, a carbon layer 2e, a Li absorbing layer 3e, a middle layer 7e, a Li compensating layer 6e, a cathode collector 14e, a cathode active material 15e and a separator 16e. The anode collector 1e, the carbon layer 2e, the Li absorbing layer 3e, the cathode collector 14e, the cathode active material 15e, the separator 16e and the electrolyte can be configured respectively similarly to the anode collector 1a, the carbon layer 2a, the Li absorbing layer 3a, the cathode collector 14a, the cathode active material 15a, the separator 16a and the electrolyte in the first embodiment. Also, the Li compensating layer 6e can be configured similarly to the Li compensating layer 6c in the second embodiment.

The middle layer 7e corresponding to the layer having the above-mentioned lithium ion conductive property has the role of separating the Li absorbing layer 3e and the Li compensating layer 6e such that the Li compensating layer 6e can effectively compensate the Li to the anode. The middle layer 7e is the ion conductive thin film, for example, the thin films of Si, Sn, Fe, $Li_2O$—$SiO_2$ base, $Li_2O$—$B_2O_3$—$SiO_2$ base, $Li_2O$—$B_2O_3$—$P_2O_5$ base, $Li_2O$—$WO_3$ base, $Li_2O$—$P_2O_5$—$SiO_2$ base, $Li_2O$—$B_2O_3$ base and a DLC film can be listed.

After the cathode, the separator and the anode are laminated or after the material in which they are laminated is winded, it is accommodated in the battery can and sealed with the flexible film composed of the lamination unit of the synthetic resin and the metallic foil, then, the battery can be manufactured.

The operation of the anode in the secondary battery shown in FIG. 7 will be described in detail.

At the time of the charge, the anode receives the lithium ions through the electrolyte from the cathode side. The lithium ions are supplied from the cathode and the Li compesating layer 6e through the middle layer 7e to the inside of the anode. The lithium ions are firstly bound to the Li absorbing layer 3e on the surface of the anode, and then form the lithium compound. At this time, since the material having the small Li absorption amount property or the element having no Li absorbing performance is added to the particle forming the Li absorbing layer 3e, the volume expansion of the particles in association with the charge is suppressed. Next, the lithium ions are absorbed into the carbon layer 2e. When it is ended, the charge is completed. At the time of the discharge, the lithium ions absorbed at the time of the charge are discharged from the carbon layer 2e, contrarily to the above-mentioned case. Next, the lithium ions absorbed in the Li absorbing layer 3e are gradually discharged without any evident plateau. Thus, it is possible to obtain the high average operation voltage. The lithium ions discharged from the anode are moved via the middle layer 7e through the electrolyte to the cathode.

Fourth Embodiment

Figure 9:
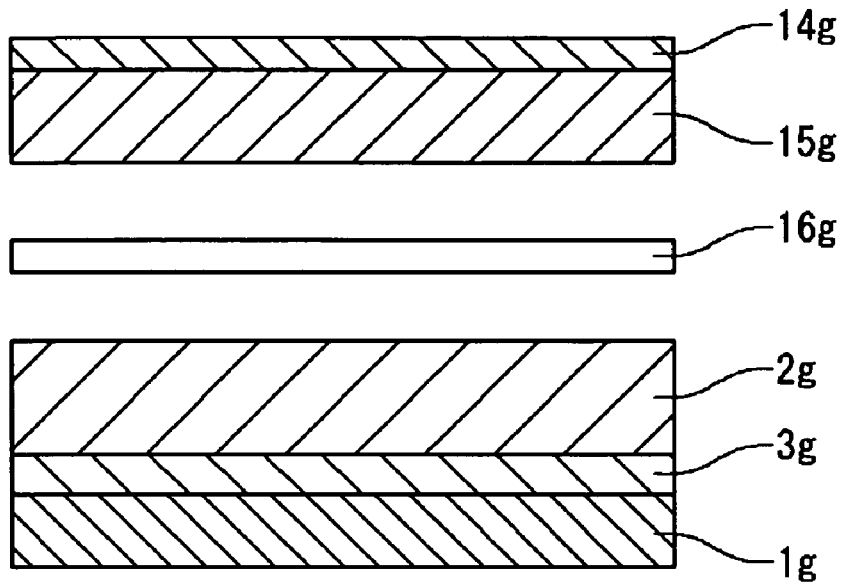
FIG. 9 is a sectional view showing a section of the secondary battery according to the fourth embodiment.

A secondary battery according to a fourth embodiment of the present invention will be described in detail with reference to the drawings. FIG. 9 is a sectional view showing a section of the secondary battery according to this embodiment.

With reference to FIG. 9, the secondary battery includes an anode collector 1g, a carbon layer 2g, a Li absorbing layer 3g, a cathode collector 14g, a cathode active material 15g and a separator 16g. The anode collector 1g, the carbon layer 2g, the Li absorbing layer 3g, the cathode collector 14g, the cathode active material 15g, the separator 16g and the electrolyte can be configured respectively similarly to the anode collector 1a, the carbon layer 2a, the Li absorbing layer 3a, the cathode collector 14a, the cathode active material 15a, the separator 16a and the electrolyte in the first embodiment.

After the cathode, the separator and the anode are laminated or after the material in which they are laminated is winded, it is accommodated in the battery can and sealed with the flexible film composed of the lamination unit of the synthetic resin and the metallic foil, then, the battery can be manufactured.

Here, the point of this embodiment different from the first embodiment is that the order of laminating the carbon layer and the Li absorbing layer is reverse.

The operation of the anode in the secondary battery shown in FIG. 9 will be described in detail.

At the time of the charge, the anode receives the lithium ions through the electrolyte from the cathode side. At first, the lithium ions are passed through the carbon layer 2g on the surface of the anode, bound to the Li absorbing layer 3g, and then form the lithium compound. At this time, since the material having the small Li absorption amount property or the element having no Li absorbing performance is added to the particles forming the Li absorbing layer 3g, the volume expansion of the particles in association with the charge is suppressed. Also, when the lithium ions are passed through the carbon layer 2g, the lithium ions are absorbed into even the carbon layer 2g although its amount is little. Next, the lithium ions are absorbed into the carbon layer 2g. In this way, the charge is completed. At the time of the discharge, the lithium ions absorbed at the time of the charge are discharged from the carbon layer 2g, contrarily to the above-mentioned case. Next, the lithium ions absorbed in the Li absorbing layer 3g are gradually discharged without any evident plateau. Thus, it is possible to obtain the high average operation voltage. The lithium ions discharged from the anode are moved through the electrolyte to the cathode.

Fifth Embodiment

Figure 10:
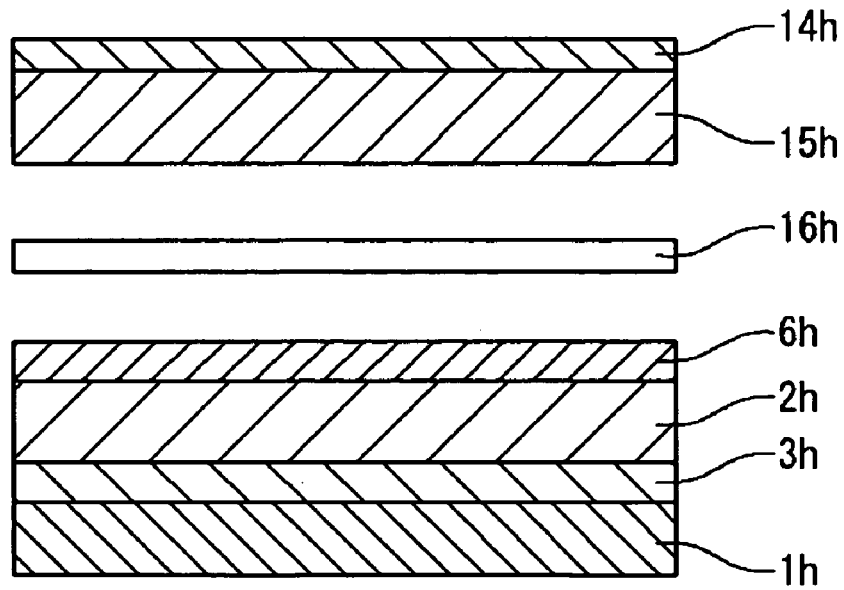
FIG. 10 is a sectional view showing a section of the secondary battery according to the fifth embodiment.

A secondary battery according to a fifth embodiment of the present invention will be described in detail with reference to the drawings. FIG. 10 is a sectional view showing a section of the secondary battery according to this embodiment.

With reference to FIG. 10, the secondary battery includes an anode collector 1h, a carbon layer 2h, a Li absorbing layer 3h, a Li compensating layer 6h, a cathode collector 14h, a cathode active material 15h and a separator 16h. The anode collector 1h, the carbon layer 2h, the Li absorbing layer 3h, the cathode collector 14h, the cathode active material 15h, the separator 16h and the electrolyte can be configured respectively similarly to the anode collector 1a, the carbon layer 2a, the Li absorbing layer 3a, the cathode collector 14a, the cathode active material 15a, the separator 16a and the electrolyte in the first embodiment. The Li compensating layer 6h corresponding to the layer composed of the above-mentioned Li or Li compound is placed in order to compensate the irreversible capacity existing inside the battery, and it can be manufactured by depositing or sticking the metallic Li or Li compound.

After the cathode, the separator and the anode are laminated or after the material in which they are laminated is winded, it is accommodated in the battery can and sealed with the flexible film composed of the lamination unit of the synthetic resin and the metallic foil, then, the battery can be manufactured.

The point of this embodiment different from the second embodiment is that the order of the laminating of the carbon layer 2h and the Li absorbing layer 3h is reverse.

The operation of the anode in the secondary battery shown in FIG. 10 will be described in detail.

At the time of the charge, the anode receives the lithium ions through the electrolyte from the cathode side. The lithium ions are supplied from the cathode and the Li compensating layer 6h to the inside of the anode, and firstly passed through the carbon layer 2h on the surface of the anode, and bound to the Li absorbing layer 3c, and then form the lithium compound. At this time, since the material having the small Li absorption amount property or the element having no Li absorbing performance is added to the particles forming the Li absorbing layer 3h, the volume expansion of the particles in association with the charge is suppressed. Next, the lithium ions are absorbed into the carbon layer 2h. In this way, the charge is completed. At the time of the discharge, the lithium ions absorbed at the time of the charge are discharged from the carbon layer 2h, contrarily to the above-mentioned case. Next, the lithium ions absorbed in the Li absorbing layer 3c are gradually discharged without any evident plateau. Thus, it is possible to obtain the high average operation voltage. The lithium ions discharged from the anode are moved through the electrolyte to the cathode.

In the battery of this embodiment, the Li compensating layer 6h enables the compensating of the lithium corresponding to the irreversible capacity. Thus, the charge and discharge efficiency can be made very high.

Sixth Embodiment

Figure 11:
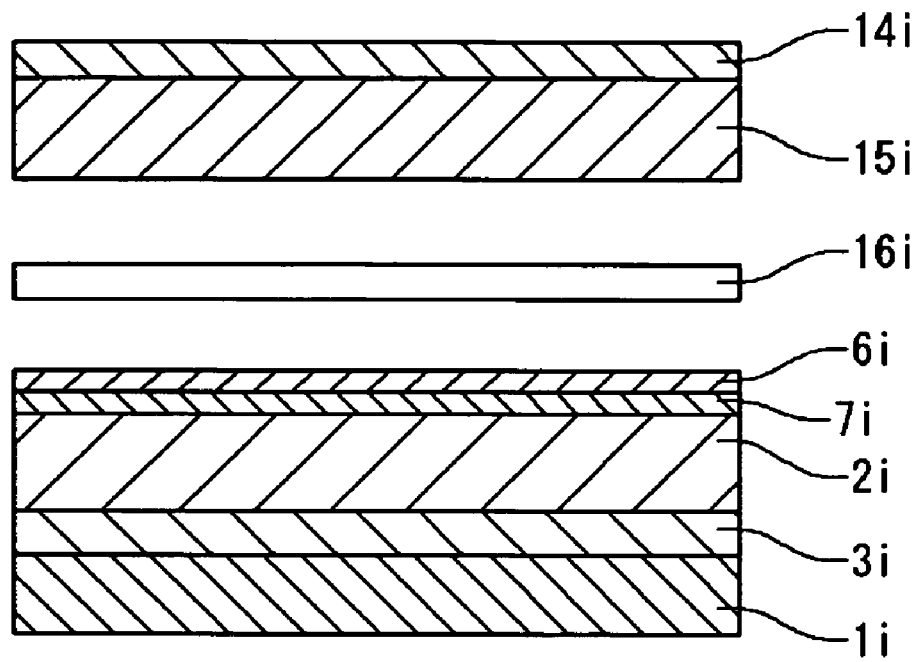
FIG. 11 is a sectional view showing a section of the secondary battery according to the sixth embodiment.

A secondary battery according to a sixth embodiment of the present invention will be described in detail with reference to the drawings. FIG. 11 is a sectional view showing the section of the secondary battery according to this embodiment.

With reference to FIG. 11, the secondary battery includes an anode collector 1i, a carbon layer 2i, a Li absorbing layer 3i, a Li compensating layer 6i, a middle layer 7i, a cathode collector 14i, a cathode active material 15i and a separator 16i. The anode collector 1i, the carbon layer 2i, the Li absorbing layer 3i, the cathode collector 14i, the cathode active material 15i, the separator 16i and the electrolyte can be configured respectively similarly to the anode collector 1a, the carbon layer 2a, the Li absorbing layer 3a, the cathode collector 14a, the cathode active material 15a, the separator 16a and the electrolyte in the first embodiment. Also, the Li compensating layer 6i can be configured similarly to the Li compensating layer 6c in the second embodiment. Also, the middle layer 7i can be configured similarly to the middle layer 7e in the third embodiment.

After the cathode, the separator and the anode are laminated or after the material in which they are laminated is winded, it is accommodated in the battery can and sealed with the flexible film composed of the lamination unit of the synthetic resin and the metallic foil, then, the battery can be manufactured.

Here, the point of this embodiment different from the third embodiment is that the order of the laminating of the carbon layer and the Li absorbing layer is reverse.

The operation of the anode in the secondary battery shown in FIG. 11 will be described in detail.

At the time of the charge, the anode receives the lithium ions through the electrolyte from the cathode side. The lithium ions are supplied from the cathode and the Li compensating layer 6i through the middle layer 7i to the inside of the anode. The lithium ions are firstly passed through the carbon layer 2i on the surface of the anode, and bound to the Li absorbing layer 3i, and then form the lithium compound. At this time, since the material having the small Li absorption amount property or the element having no Li absorbing performance is added to the particles forming the Li absorbing layer 3i, the volume expansion of the particles in association with the charge is suppressed. Next, the lithium ions are absorbed into the carbon layer 2i. In this way, the charge is completed. At the time of the discharge, the lithium ions absorbed at the time of the charge are discharged from the carbon layer 2i, contrarily to the above-mentioned case. Next, the lithium ions absorbed in the Li absorbing layer 3i are gradually discharged without any evident plateau. Thus, it is possible to obtain the high average operation voltage. The lithium ions discharged from the anode are moved via the middle layer 7i through the electrolyte to the cathode.

As mentioned above, the anode for the secondary battery in the present invention has the anode active material layer that can absorb and discharge the lithium ions. The anode active material layer includes: the first layer whose chief ingredient is the carbon; and the second layer containing the element having the theoretical capacity greater than that of the graphite and the element having the theoretical capacity equal to or less than that of the graphite. For example, the anode includes: the first layer whose chief ingredient is the carbon; and the second layer including the element having the theoretical capacity greater than that (372 mAh/g) of the graphite. Using of the above-mentioned configuration enables the increase in the capacity of the anode, and simultaneously enables the gradual change in the operation voltage at the time of the discharge, and then enables the attainment of the high average operation voltage.

Also, since the first and second layers are laminated as mentioned above, the resistance and capacitance in the direction vertical to the electrode become uniform. Since this makes the applied electric field strength and the current amount uniform, it contributes to the stable battery operation. Moreover, in the above-mentioned second layer, the element having the theoretical capacity equal to or less than the that of the graphite is added to the element having the theoretical capacity greater than the that of the graphite. This suppresses the expansion and contraction of the volume of the above-mentioned second layer at the time of the charge and discharge, and keeps the electrical contact.

Also, in the anode for the secondary battery as mentioned above, the above-mentioned second layer includes the particles containing: the element having the theoretical capacity greater than that of the graphite; and the element having the theoretical capacity equal to or less than that of the graphite. Thus, the effect of suppressing the expansion and contraction of the volume of the second layer as mentioned above is further increased.

Also, in the anode for the secondary battery as mentioned above, as for the particle including: the element having the theoretical capacity greater than the that of the graphite as mentioned above; and the element having the theoretical capacity equal to or less than that of the graphite, the surface of the particle composed of the element having the theoretical capacity greater than that of the graphite is coated by the element having the theoretical capacity equal to or less than that of the graphite.

Also, in the anode for the secondary battery as mentioned above, as for the particle including: the element having the theoretical capacity greater than the that of the graphite as mentioned above; and the element having the theoretical capacity equal to or less than that of the graphite, the surface of the particle composed of the element having the theoretical capacity equal to or less than that of the graphite is coated by the element having the theoretical capacity greater than that of the graphite.

Using of the above-mentioned configuration enables the volume change in the particle constituting the above-mentioned second layer to be effectively suppressed, which can attain the longer life of the entire anode.

Also, in the anode for the secondary battery as mentioned above, the particle including: the element having the theoretical capacity greater than that of the above-mentioned graphite; and the element having the theoretical capacity equal to or less than that of the graphite is formed by any of a CVD method, an depositing method, a sputtering method, a mechanically milling method and a mechanical alloy method. The particle formed by the above-mentioned method effectively contributes to the suppression in the volume expansion and contraction of the second layer as mentioned above.

Also, in the anode for the secondary battery as mentioned above, the element having the theoretical capacity greater than that of the above-mentioned graphite is, for example, the element selected from a group composed of Si, Ge, Sn, Al, Pb, Pd, Ag, In and Cd. As the element having the theoretical capacity greater than that of the graphite, the above-mentioned element is desired to be selected, from the viewpoint of the energy density and the cost.

Also, in the anode for the secondary battery, the element having the theoretical capacity equal to or less than that of the above-mentioned graphite is the element selected from a group composed of C, Fe and Cu. As the element having the theoretical capacity equal to or less than that of the graphite, the above-mentioned element is desired to be selected, from the viewpoint of the energy density and the cost.

Also, the anode for the secondary battery as mentioned above further includes the layer made of the Li or Li compound. This can supply the Li corresponding to the irreversible capacity inside the battery, which can consequently improve the charge and discharge efficiency.

Also, in the anode for the secondary battery as mentioned above, the Li compound is desired to include LiF or $Li_2O$. As the above-mentioned Li compound, the above-mentioned compound is desired from the viewpoint of the energy density and the cost.

Also, the anode for the secondary battery as mentioned above may further include the layer having the lithium ion conductive property. Further including of the layer having the lithium ion conductive property enables the Li compensation from the layer made of the above-mentioned Li or Li compound to be smoothly advanced, which further improves the charge and discharge efficiency.

Also, in the anode for the secondary battery as mentioned above, the layer having the above-mentioned lithium ion conductivity is placed between the above-mentioned first layer and the layer composed of the above-mentioned Li or Li compound. Using of such configuration enables the Li compensation to the first layer to be smoothly advanced.

Also, in the anode for the secondary battery as mentioned above, the layer having the above-mentioned lithium ion conductive property is composed of the materials selected from a group composed of Si, Sn, DLC, $Li_2O$—$SiO_2$ based compound, $LiO_2$—$B_2O_3$—$SiO_2$ based compound, $Li_2O$—$B_2O_3$—$P_2O_5$ based compound, $Li_2O$—$WO_3$ based compound, $Li_2O$—$P_2O_5$—$SiO_2$ based compound and $Li_2O$—$B_2O_3$ based compound. As the layer having the above-mentioned lithium ion conductivity, the above-mentioned layer is desired from the viewpoint of the energy density and the cost.

Also, in the anode for the secondary battery as mentioned above, a volume A of the element having the theoretical capacity greater than the that of the above-mentioned graphite and a volume B of the element having the theoretical capacity equal to or less than that of the above-mentioned graphite are desired to satisfy $0.001 \leq B/(A+B) \leq 0.5$. Using such an anode can obtain the secondary battery which is superior in battery capacity and cycle property.

Also, the anode for the secondary battery as mentioned above further includes an electric collector, and the electric collector and the above-mentioned first layer are adjacent to each other. Due to this structure, the connection between the electric collector and the active material layer (the above-mentioned first and second layers) can be made stronger, thereby reserving the much stable operation. Also, the anode for the secondary battery as mentioned above may further includes an electric collector, and the electric collector and the above-mentioned second layer may be adjacent to each other. Due to this structure, even if the above-mentioned second layer is partially separated from the electric collector, it is possible to keep the electric connection through the above-mentioned first layer to the collector, and possible to continue to contribute to the charge and discharge. Consequently, it is possible to improve the cycle property.

Also, this includes: the anode for the secondary battery as mentioned above; the cathode that can absorb and discharge the lithium ions; and the electrolyte placed between the anode for the secondary battery as mentioned above and the above-mentioned cathode. Thus, it is possible to obtain the secondary battery which functions at the high operation voltage under the stable operation and is superior in cycle property.

The experiment example will be described below.

EXPERIMENT EXAMPLE 1

The experiment example 1 will be described below with reference to FIG. 1.

The copper foil of a thickness of 10 μm was used for the anode collector 1a. The graphite of a thickness of 60 μm was used for the carbon layer 2a. The carbon layer 2a was produced by coating the material, in which the graphite, the poly-vinylidene fluoride (binder) dissolved in N-methyl-2-pyrrolidone, and the conductive additives were mixed into paste form, on the anode collector 1a and then drying it.

Also, the particles shown in FIG. 2 were used for the anode material included in the Li absorbing layer 3a. In the particle, the Si particle was used as the Li absorbing material 4a, and this Si particle was covered with the carbon by using the CVD method, and the carbon film (buffering material 5a) was formed. In this embodiment, the carbon film (buffering material 5a) has the role of suppressing the expansion and contraction of the Si particle (Li absorbing material 4a), and also contributes to the charge and the discharge. The Li absorbing layer 3a of a thickness of 2 μm was formed by coating the material in which the above-mentioned particles of an average particle diameter of 8 μm, the poly-vinylidene fluoride dissolved in the N-methyl-2-pyrrolidone, and the conductive additives were mixed into the paste form, on the carbon layer 2a, and drying it.

Also, the aluminum foil of a thickness of 20 μm was used for the cathode collector 14a, and the $Li_{1.1}Mn_2O_4$ of a thickness of 100 μm was used for the cathode active material 15a. The material in which poly-propylene and poly-ethylene were laminated in multi-layer form was used for the separator 16a. As the electrolyte, the material in which the $LiPF_6$ of 1 mol/L as support salt was added to the mixture of a rate of EC/DEC=3:7 was used.

A coin type battery was manufactured by using the above-mentioned materials, and the electrochemical property evaluation was executed.

EXPERIMENT EXAMPLE 2

The experiment example 2 will be described below with reference to FIG. 1.

The copper foil of a thickness of 10 μm was used for the anode collector 1a. The graphite of a thickness of 60 μm was used for the carbon layer 2a. The carbon layer 2a was produced by coating the material, in which the graphite, the poly-vinylidene fluoride (binder) dissolved in the N-methyl-2-pyrrolidone, and the conductive additives were mixed into paste form, on the anode collector 1a and then drying it.

Also, the Li absorbing layer 3a was produced by coating the material on which the carbon particles were coated with the Si film by 2 μm, as shown in FIG. 3. In this particle, the carbon particle was used as the buffering material 5a, and for this carbon particle, the Si film (Li absorbing material) 4a was formed by the depositing method. The Li absorbing layer 3a of a thickness of 2 μm was formed by coating the material, in which the above-mentioned particles of an average particle diameter of 1.0 μm, the poly-vinylidene fluoride dissolved in the N-methyl-2-pyrrolidone, and the conductive additives were mixed into the paste form, on the carbon layer 2a, and drying it.

Also, the aluminum foil of a thickness of 20 μm was used for the cathode collector 14a, and the $Li_{1.1}Mn_2O_4$ of a thickness of 90 μm was used for the cathode active material 15a. The material in which the poly-propylene and the poly-ethylene were laminated in multi-layer form was used for the separator 16a. As the electrolyte, the material in which the $LiPF_6$ of 1 mol/L as the support salt was added to the mixture of the rate of EC/DEC=3:7 was used.

The coin type battery was manufactured by using the above-mentioned materials, and the electrochemical property evaluation was executed.

EXPERIMENT EXAMPLE 3

The experiment example 3 of the present invention will be described below, and the present invention will be described.

The copper foil of a thickness of 12 μm was used for the anode collector 1a, the graphite of a thickness of 40 μm was used for the carbon layer 2a, the material in which the SiO particles as the Li absorbing material 4a and the carbon particles as the buffering material 5a were mixed was coated by 2 μm for producing the Li absorbing layer 3a. FIG. 12 is the sectional view showing the particle constituting the Li absorbing layer 3a. The buffering material 5a has the role of suppressing the expansion and contraction of the Si particle, and it contributes to even the charge and discharge. The carbon layer 2a was produced by coating the material, in which the poly-vinylidene fluoride dissolved in the N-methyl-2-pyrrolidone as the binder, and the conductive additives were mixed into paste form, on the anode collector 1a and then drying it. On it, the material of an average particle diameter of 5 μm, in which the SiO particles were used as the Li absorbing material 4a and the carbon particles were mixed as the buffering material 5a around it, was mixed with the poly-vinylidene fluoride dissolved in the N-methyl-2-pyrrolidone and the conductive additives into paste form and coated, thereby forming the Li absorbing layer 3a of a thickness of 10 μm.

The $LiCoO_2$ of a thickness of 100 μm was used for the 5 cathode active material. The material in which the poly-propylene and the poly-ethylene were laminated in multi-layer form was used for the separator. For the electrolyte, the material in which the $LiPF_6$ as the support salt was added to the mixture of EC/DEC=3:7 was used. The battery was manufactured by using the above-mentioned materials, and the electrochemical property evaluation was executed.

Comparison Example 1

Figure 4:
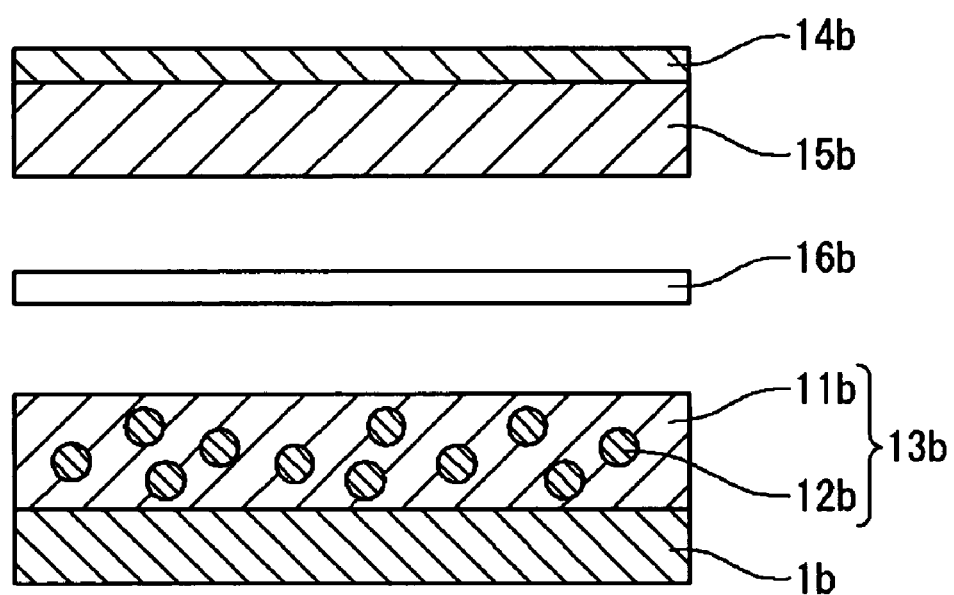
FIG. 4 is a sectional view showing a section of the secondary battery of the comparison example 1.

The comparison example 1 will be described below with reference to FIG. 4.

The copper foil of a thickness of 10 μm was used for the anode collector 1b. A anode layer 13b of a thickness of 50 μm was formed on the anode collector 1b. The anode layer 13b was produced by coating the material, in which a carbon particle 11b, a silicon particle 12b, the poly-vinylidene fluoride (binder) dissolved in the N-methyl-2-pyrrolidone, and the conductive additives were mixed into paste form, on the anode collector 1b, and drying it. The weight ratio of the carbon particles to the silicon particles was 9:1. The anode collector 1b, the cathode collector 14b, the cathode active material 15b, the separator 16b and the electrolyte were configured similarly to the experiment example 1. Then, the coin type battery was manufactured by using the above-mentioned materials, and the electrochemical property evaluation was executed.

A table 1 shows the initial charge and discharge efficiencies and the average operation voltages in the experiment example 1, the experiment example 2, the experiment example 3 and the comparison example 1.

TABLE 1

|  | Exp. ex. 1 | Exp. ex. 2 | Exp. ex. 3 | Comparison ex. 1 |
|---|---|---|---|---|
| Initial charge and discharge efficiency | 93% | 92% | 92% | 81% |
| Average operation voltage | 3.74 V | 3.74 V | 3.73 V | 3.45 V |

As shown in the table 1, in the batteries of the experiment examples 1, 2, 3 their initial charge and discharge efficiencies were found to be higher by about 10% than that of the battery of the comparison example 1. Also, the average operation voltages of the batteries in the experiment examples 1, 2, 3 were 3.74V at the time of 0.2 C discharge, however, that of the battery in the comparison example 1 was 3.45V at the time of the 0.2 C discharge. Thus, it was evident that the experiment examples 1, 2, 3 are superior in energy (voltage × current) to the comparison example 1.

EXPERIMENT EXAMPLE 4

The experiment example 4 will be described below with reference to FIG. 1.

The copper foil of a thickness of 10 μm was used for the anode collector 1a. The graphite of a thickness of 60 μm was used for the carbon layer 2a. The carbon layer 2a was produced by coating the material, in which the graphite, the poly-vinylidene fluoride (binder) dissolved in the N-methyl-2-pyrrolidone, and the conductive additives were mixed into paste form, on the anode collector 1a, and drying it.

Also, the particles shown in FIG. 2 were used for the anode material included in the Li absorbing layer 3a. In this particle, the Si particle was used for the Li absorbing material 4a, and this Si particle was covered with the carbon by using the CVD method, and the carbon film (buffering material) 5a was formed. The Li absorbing layer 3a of a thickness of 2 μm was formed by coating the material, in which the above-mentioned particles of an average particle diameter of 0.8 μm, the poly-vinylidene fluoride dissolved in the N-methyl-2-pyrrolidone, and the conductive additives were mixed into paste form, on the carbon layer 2a, and drying it. In this embodiment, the carbon film (buffering material) 5a has the role of suppressing the expansion and contraction of the Si particle (Li absorbing material 4a) and contributes to even the charge and discharge. In this embodiment, 17 patterns are investigated as shown in a table 2, with regard to the volume rate between the Si particle and the carbon. In the table 2, the rate occupied by the carbon is the rate occupied by the carbon in the anode material included in the Li absorbing layer 3a, and it is the value calculated from (carbon/(Si particle+carbon)× 100 (vol %).

Also, the aluminum foil of a thickness of 20 μm was cathode collector 14a, and the $Li_{1.1}Mn_2O_4$ of a thickness of 90 μm was used for the cathode active material 15a. The material in which the poly-propylene and the poly-ethylene were laminated in multi-layer form was used for the separator 16a. As the electrolyte, the material in which the $LiPF_6$ of 1 mol/L as the support salt was added to the mixture of a rate of EC/DEC=3:7 was used.

TABLE 2

| Buffering material/(Li absorbing material) [Vol %] | Battery capacity [mAh] | Capacity maintaining rate [%] |
|---|---|---|
| 0 | 750 | 55 |
| 0.01 | 750 | 61 |
| 0.05 | 750 | 70 |
| 0.1 | 750 | 81 |
| 0.5 | 750 | 82 |
| 1 | 750 | 83 |
| 5 | 745 | 83 |
| 10 | 740 | 84 |
| 15 | 735 | 84 |
| 20 | 730 | 83 |
| 30 | 720 | 83 |
| 40 | 710 | 82 |
| 45 | 705 | 83 |
| 50 | 700 | 84 |
| 55 | 695 | 84 |
| 60 | 690 | 83 |
| 70 | 680 | 83 |

The coin type battery was manufactured by using the above-mentioned materials, and the electrochemical property evaluation was executed.

The table 2 shows the relation between the rate (volume ratio) occupied by the carbon in the anode material included in the Li absorbing layer 3a and the capacity and cycle property.

The cycle property was evaluated based on the capacity maintaining rate after 300 cycles (Discharging capacity after 300 cycles/Initial discharging capacity ×100[%]). As a result, it was found that if the rate occupied by the carbon in the anode material included in the Li absorbing layer 3a is 0.1% or more, the capacity maintaining rate exceeds 80%. On the other hand, if the rate occupied by the carbon was less than 0.1%, the good cycle property was not obtained. This reason may be that the volume expansion and contraction of the Si particle in association with the charge and discharge cannot be sufficiently suppressed.

Also, from the viewpoint of the battery capacity, when the rate occupied by the carbon in the anode material included in the Li absorbing layer 3a exceeded 50%, the capacity became below 700 mAh, and it was found that the rate occupied by the carbon in the anode material included in the Li absorbing layer 3a should be 50% or less.

EXPERIMENT EXAMPLE 5

This experiment example will be described below with reference to FIG. 5.

With reference to FIG. 5, the copper foil of a thickness of 50 μm was used for the anode collector 1c. A hard carbon of a thickness of 50 μm was used for the carbon layer 2c. The carbon layer 2c was produced by coating the material, in which the hard carbon, the poly-vinylidene fluoride (binder) dissolved in the N-methyl-2-pyrrolidone, and the conductive additives were mixed into paste form, on the anode collector 1c, and drying it.

Also, as the anode material included in the Li absorbing layer 3c, the particles having the average particle diameter of 1 μm was used, the particles were produced by the mechanically milling method in which the Si particles as the Li absorbing material 4a and the carbon particles as the buffering material were mixed. The Li absorbing layer 3c of a thickness of 2 μm was formed by coating the material, in which the above-mentioned particles, the poly-vinylidene fluoride dissolved in the N-methyl-2-pyrrolidone, and the conductive additives were mixed into paste form, on the carbon layer 2a, and drying it. Moreover, the Li compensating layer 6c of a thickness of 1 μm was formed by depositing Li on the Li absorbing layer 3c.

Also, the aluminum foil of a thickness of 20 μm was used for the cathode collector 14c, and the $Li_{1.1}Mn_2O_4$ of a thickness of 100 μm was used for the cathode active material 15c. The material in which the poly-propylene and the poly-ethylene were laminated in multi-layer form was used for the separator 16c. As the electrolyte, the material in which the $LiPF_6$ of 1 mol/L as the support salt was added to the mixture of a rate of EC/DEC=3:7 was used.

The coin type battery was manufactured by using the above-mentioned materials, and the electrochemical property evaluation was executed.

EXPERIMENT EXAMPLE 6

This experiment example will be described below with reference to FIG. 5.

With reference to FIG. 5, the copper foil of a thickness of 10 μm was used for the anode collector 1c. The mixture of the hard carbon of a thickness of 50 μm and the graphite was used for the carbon layer 2c. The carbon layer 2c was produced by coating the material, in which the mixture of the hard carbon and the graphite, the poly-vinylidene fluoride (binder) dissolved in the N-methyl-2-pyrrolidone, and the conductive additives were mixed into paste form, on the anode collector 1c, and drying it.

Also, as the anode material included in the Li absorbing layer 3c, the particles (the average particle diameter of 1 μm) were used, which were alloy of Si as the Li absorbing material 4a and Fe as the buffering material 5a. The Li absorbing layer 3c of a thickness of 2 μm was formed by coating the material, in which the above-mentioned particles, the poly-vinylidene fluoride dissolved in the N-methyl-2-pyrrolidone, and the conductive additives were mixed into paste form, on the carbon layer 2c, and drying it. Moreover, the Li compensating layer 6c of a film thickness of 1 μm was formed by depositing $Li_2O$ on the Li absorbing layer 3c.

Also, the aluminum foil of a thickness of 20 μm was used for the cathode collector 14c, and the $LiCoO_2$ of a thickness of 85 μm was used for the cathode active material 15c. The material in which the poly-propylene and the poly-ethylene were laminated in multi-layer form was used for the separator 16c. As the electrolyte, the material in which the $LiPF_6$ of 1 mol/L as the support salt was added to the mixture of a rate of EC/DEC=3:7 was used.

The coin type battery was manufactured by using the above-mentioned materials, and the electrochemical property evaluation was executed.

EXPERIMENT EXAMPLE 7

The copper foil of a thickness of 10 μm was used for the anode collector 1c, the artificial graphite of a thickness of 50 μm was used for the carbon layer 2c, and the Li absorbing layer 3c was produced by coating the alloy particles by 3 μm, which were composed of SiO as the Li absorbing material 4a of an average particle diameter of 1 μm and Fe as the buffering material 5a. The buffering material has the role of suppressing the expansion and contraction of the Li absorbing material. The carbon layer 2c was produced by coating the material, in which the poly-vinylidene fluoride dissolved in the N-methyl-2-pyrrolidone as the binder and the conductive additives were mixed in paste form, on the anode collector 1a and drying it. On it, the alloy particles, the poly-vinylidene fluoride dissolved in the N-methyl-2-pyrrolidone and the conductive additives were mixed in paste form, and coated to form the Li absorbing layer 3c of a thickness of 2 μm. The $Li_2O$ as the Li compensating layer 6c for compensating the irreversible capacity was deposited on the Li absorbing layer 3c.

The $LiCoO_2$ of a thickness of 85 μm was used for the cathode active material. The material in which the poly-propylene and the poly-ethylene were laminated in multilayer form was used for the separator, the material in which the $LiPF_6$ as the support salt was added to the mixture of EC/DEC=3:7 was used for the electrolyte. The battery was manufactured by using the above-mentioned materials, and the electrochemical property evaluation was carried out.

Comparison Example 2

The comparison example 2 will be described below with reference to FIG. 6.

Figure 6:
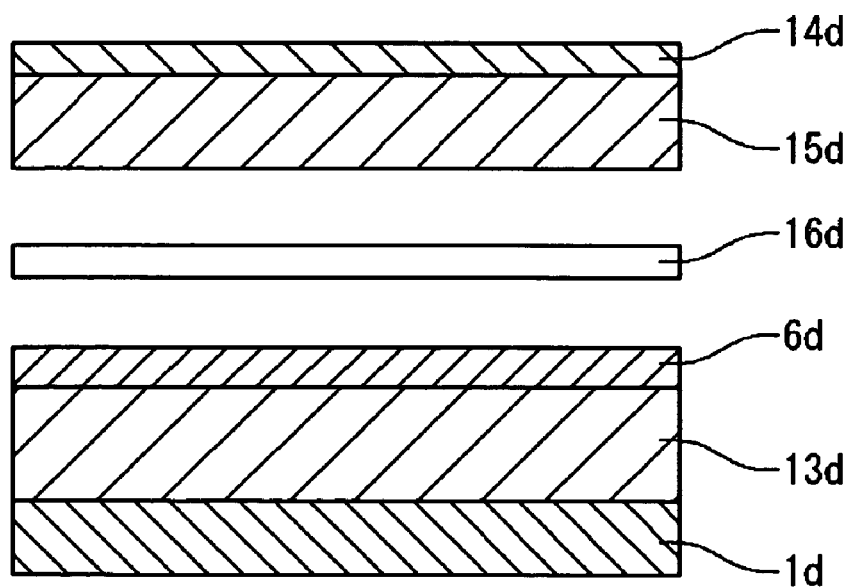
FIG. 6 is a sectional view showing a section of the secondary battery of the comparison example 2.

With reference to FIG. 6, the copper foil of a thickness of 10 μm was used for the anode collector 1d.

The anode layer 13d of a thickness of 45 μm was formed on the anode collector 1d. The anode layer 13d was produced by coating the material, in which the Si particles (an average particle diameter of 1 μm) covered with the carbon film, the poly-vinylidene fluoride dissolved in the N-methyl-2-pyrrolidone as the binder, and the conductive additives were mixed into paste form, on the anode collector 1d, and drying it. Moreover, the Li compensating layer 6d of a film thickness of 1 μm was formed by depositing the Li on the anode layer 13d.

The cathode collector 14d, the cathode active material 15d, the separator 16d and the electrolyte were designed so as to have the configuration similar to the cathode collector 14c, the cathode active material 15c, the separator 16c and the electrolyte in the experiment example 4, respectively, then, the initial charge and discharge efficiencies and the average operation voltages were evaluated. A table 3 shows its result.

TABLE 3

|  | Exp. ex. 5 | Exp. ex. 6 | Exp. ex. 7 | Comparison ex. 2 |
| --- | --- | --- | --- | --- |
| Initial charge and discharge efficiency | 95% | 95% | 95% | 95% |
| Average operation voltage | 3.75 V | 3.75 V | 3.74 V | 3.45 V |

As for the initial charge and discharge efficiency, using the Li compensating layer, all of the experiment example 5, the experiment example 6, the experiment example 7 and the comparison example 2 indicated the high value of 95%.

On the other hand, the average operation voltage was 3.75V at the time of the 0.2 C discharge in the experiment examples 5, 6, 7 however, it was only 3.45V in the comparison example 2. Thus, it was found that the configuration having the carbon layer 2c is superior in energy (voltage x current).

EXPERIMENT EXAMPLE 8

This experiment example will be described below with reference to FIG. 7.

The copper foil of a thickness of 10 µm was used for the anode collector 1e. The graphite of a thickness of 60 µm was used for the carbon layer 2e. The carbon layer 2e was produced by coating the material, in which the graphite, the poly-vinylidene fluoride (binder) dissolved in the N-methyl-2-pyrrolidone, and the conductive additives were mixed in paste form, on the anode collector 1e, and drying it.

Also, the Li absorbing layer 3e was configured similarly to the Li absorbing layer 3a in the embodiment 2.

Next, the middle layer 7 of a film thickness of 100 nm was formed by depositing Si on the Li absorbing layer 3e. Moreover, the Li compensating layer 6e was formd by depositing Li by 1 µm on the middle layer 7e.

Also, the aluminum foil of a thickness of 20 µm was used for the cathode collector 14e, and the $Li_{1.1}Mn_2O_4$ of a thickness of 100 µm was used for the cathode active material 15e. The material in which the poly-propylene and the poly-ethylene were laminated in multilayer form was used for the separator 16e, the material in which the $LiPF_6$ as the support salt was added to the mixture of EC/DEC=3:7 was used for the electrolyte. The battery was manufactured by using the above-mentioned materials, and the electrochemical property evaluation was executed.

EXPERIMENT EXAMPLE 9

This experiment example will be described below with reference to FIG. 7.

The copper foil of the thickness of 10 µm was used for the anode collector 1e. The graphite of the thickness of 60 µm was used for the carbon layer 2e. The carbon layer 2e was produced by coating the material, in which the graphite, the poly-vinylidene fluoride (binder) dissolved in the N-methyl-2-pyrrolidone, and the conductive additives were mixed into paste form, on the anode collector 1e, and drying it.

Also, as the anode material included in the Li absorbing layer 3e, the particles having the average particle diameter of 1.5 µm was used, the particles were produced by the mechanically milling method in which the Si particles as the Li absorbing material and the carbon particles as the buffering material were mixed. The Li absorbing layer 3e of a thickness of 3 µm was formed by coating the material, in which the above-mentioned particles, the poly-vinylidene fluoride dissolved in the N-methyl-2-pyrrolidone, and the conductive additives were mixed into paste form, on the carbon layer 2e, and drying it. The above-mentioned carbon particle has the role of suppressing the expansion and contraction of the above-mentioned Li absorbing material, and contributes to even the charge and discharge.

Moreover, the middle layer 7e was formed by depositing DLC of 100 nm on the Li absorbing layer 3e. Also, on the middle layer 7e, the Li of 1 µm was deposited as the Li compensating layer 6e for compensating the irreversible capacity.

Also, the aluminum foil of a thickness of 20 µm was used as the cathode collector 14e, and the $Li_{1.1}Mn_2O_4$ of a thickness of 115 µm was used for the cathode active material 15e. The material in which the poly-propylene and the poly-ethylene were laminated in multilayer form was used for the separator 16e, the material in which the $LiPF_6$ as the support salt was added to the mixture of EC/DEC=3:7 was used for the electrolyte. The battery was manufactured by using the above-mentioned materials, and the electrochemical property evaluation was executed.

EXPERIMENT EXAMPLE 10

This experiment example will be described below with reference to FIG. 7.

The copper foil of the thickness of 10 µm was used for the anode collector 1e. The hard carbon of a thickness of 60 µm was used for the carbon layer 2e. The carbon layer 2e was produced by coating the material, in which the hard carbon, the poly-vinylidene fluoride (binder) dissolved in the N-methyl-2-pyrrolidone, and the conductive additives were mixed into paste form, on the anode collector 1e, and drying it.

Also, as the anode material included in the Li absorbing layer 3e, the particles (the average particle diameter 1.5 µm) were used, the particles were alloy of the Si as the Li absorbing material 4a and the Fe as the buffering material 5a. The Li absorbing layer 3e of the thickness of 3 µm was formed by coating the material, in which the above-mentioned particles, the poly-vinylidene fluoride dissolved in the N-methyl-2-pyrrolidone, and the conductive additives were mixed into past form, on the carbon layer 2e, and drying it. The Fe has the role of suppressing the expansion and contraction of the above-mentioned anode material.

Moreover, the middle layer 7e was formed by depositing the $Li_2O$—$B_2O_3$—$SiO_2$ based compound of 100 nm on the Li absorbing layer 3e. Also, on the middle layer 7e, the LiF was deposited by 1 µm as the Li compensating layer 6e for compensating the irreversible capacity.

Also, the aluminum foil of the thickness of 20 µm was used as the cathode collector 14e, and the $Li_{1.1}Mn_2O_4$ of the thickness of 115 µm was used for the cathode active material 15e. The material in which the poly-propylene and the poly-ethylene were laminated in multilayer form was used for the separator 16e, the material in which the $LiPF_6$ as the support salt was added to the mixture of EC/DEC=3:7 was used for the electrolyte. The battery was manufactured by using the above-mentioned materials, and the electrochemical property evaluation was executed.

Comparison Example 3

Figure 8:
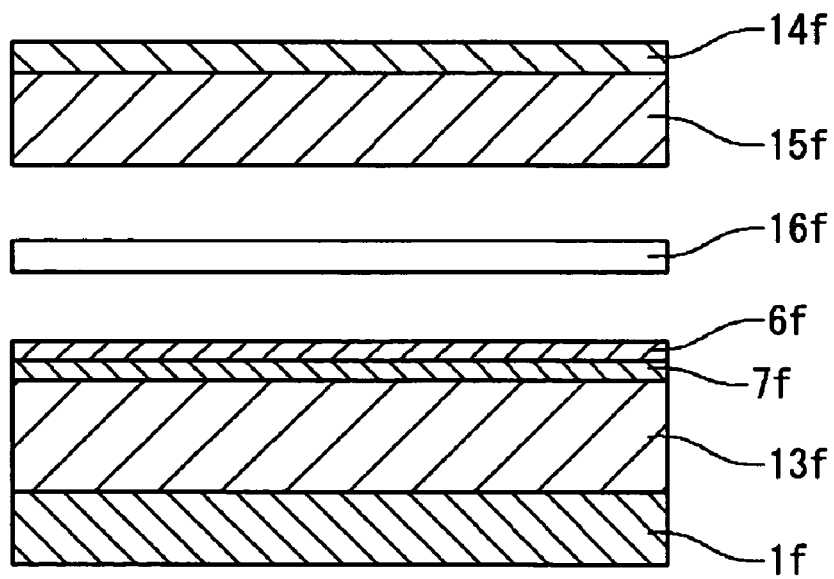
FIG. 8 is a sectional view showing a section of the secondary battery of the comparison example 3.

The comparison example 3 will be described below with reference to FIG. 8.

The copper foil of the thickness of 10 µm was used for the anode collector 1f. The anode layer 13f of the thickness of 45 µm was formed on the anode collector 1f. The anode layer 13f was produced by coating the material, in which the Si particles (the average particle diameter of 1 µm) covered with the carbon film, the poly-vinylidene fluoride dissolved in the N-methyl-2-pyrrolidone as the binder, and the conductive additives were mixed in paste form, on the anode collector 1f, and drying it.

Also, on the anode layer 13f, the Fe film of a film thickness of 10 nm was formed by using the sputtering method as a middle layer 7f. Moreover, on the middle layer 7f, the Li of 1 µm was deposited as the Li compensating layer 6f for compensating the irreversible capacity.

The cathode collector 14f, the cathode active material 15f, the separator 16f and the electrolyte were designed so as to have the configuration similar to the cathode collector 14e, the cathode active material 15e, the separator 16e and the electrolyte in the embodiment 6, respectively. Then, the initial charge and discharge efficiencies and the average operation voltages were evaluated. A table 4 shows its result.

TABLE 4

|  | Exp. ex. 8 | Exp. ex. 9 | Exp. ex. 10 | Comparison ex. 3 |
|---|---|---|---|---|
| Initial charge and discharge efficiency | 99% | 98% | 98% | 98% |
| Average operation voltage | 3.75 V | 3.75 V | 3.75 V | 3.45 V |
| Capacity maintaining rate (after 300 cycles) | 85% | 83% | 82% | 52% |

With regard to the initial charge and discharge efficiency, since all of the experiment examples 8 to 10 carried out the Li compensation and had the middle layer 7, they indicated the values higher than the initial charge and discharge efficiencies of the batteries in the experiment examples 6, 7. Consequently, it was indicated that the existence of the middle layer 7e contributes to the smooth Li supply to the anode active material from the Li compensating layer 6e.

Also, the average operation voltage was 3.75V at the time of the 0.2 C discharge in the experiment examples 8 to 10, however, it was only 3.45V in the comparison example 3. Thus, it was found that the configuration having the carbon layer 2e is superior in energy (voltage x current).

Moreover, although the capacity maintaining rate after 300 cycles was 52% in the comparison example 3, all of the experiment examples 8 to 10 exhibited the excellent result of 80% or more. Thus, it was known that the use of the configuration having the carbon layer 2e improves the cycle property.

EXPERIMENT EXAMPLE 11

This experiment example will be described below with reference to FIG. 9.

The copper foil of the thickness of 10 µm was used for the anode collector 1g. As the anode material included in the Li absorbing layer 3g, it was used which was similar to the anode material included in the Li absorbing layer 3a in the embodiment 1. The Li absorbing layer 3g of a thickness of 2 µm was produced by coating the material, in which the above-mentioned particles, the poly-vinylidene fluoride dissolved in the N-methyl-2-pyrrolidone, and the conductive additives were mixed into paste form, on the anode collector 1g, and drying it.

The graphite of a thickness of 60 µm was used for the carbon layer 2g. The carbon layer 2g was formed by coating the material, in which the graphite, the poly-vinylidene fluoride (binder) dissolved in the N-methyl-2-pyrrolidone, and the conductive additives were mixed into paste form, on the Li absorbing layer 3g and drying it.

Also, the aluminum foil of the thickness of 20 µm was used as the cathode collector 14g, and the $Li_{1.1}Mn_2O_4$ of a thickness of 100 µm was used for the cathode active material 15g. The material in which the poly-propylene and the poly-ethylene were laminated in multilayer form was used for the separator 16g, the material in which the $LiPF_6$ as the support salt was added to the mixture of EC/DEC=3:7 was used for the electrolyte. The battery was manufactured by using the above-mentioned materials, and the electrochemical property evaluation was executed.

EXPERIMENT EXAMPLE 12

This experiment example will be described below with reference to FIG. 9.

With reference to FIG. 9, the copper foil of the thickness of 10 µm was used for the anode collector 1g. As the anode material included in the Li absorbing layer 3g, the particles (the average particle diameter of 1 µm) were used, the particles were formed by the mechanically milling method using the Sn particlse and the carbon particles. The Li absorbing layer 3g of the thickness of 2 µm was formed by coating the material, in which the above-mentioned particles, the poly-vinylidene fluoride dissolved in the N-methyl-2-pyrrolidone, and the conductive additives were mixed into paste form, on the anode collector 1g, and drying it.

The graphite of the thickness of 60 µm was used for the carbon layer 2g. The carbon layer 2g was formed by coating the material, in which the graphite, the poly-vinylidene fluoride (binder) dissolved in the N-methyl-2-pyrrolidone, and the conductive additives were mixed into paste form, on the Li absorbing layer 3g and drying it.

Also, the aluminum foil of the thickness of 20 µm was used as the cathode collector 14g, and the $Li_{1.1}Mn_2O_4$ of a thickness of 90 µm was used for the cathode active material 15g. The material in which the poly-propylene and the poly-ethylene were laminated in multilayer form was used for the separator 16g, the material in which the $LiPF_6$ as the support salt was added to the mixture of EC/DEC=3:7 was used for the electrolyte. The battery was manufactured by using the above-mentioned materials, and the electrochemical property evaluation was executed.

A table 5 shows the initial charge and discharge efficiencies and average operation voltages in the experiment examples 11, 12 and comparison example 1.

TABLE 5

|  | Exp. ex. 11 | Exp. ex. 12 | Comparison ex. 1 |
|---|---|---|---|
| Initial change and discharge efficiency | 93% | 92% | 81% |
| Average operation voltage | 3.74 V | 3.74 V | 3.45 V |

As shown in the table 5, in the batteries of the experiment examples 11, 12, their initial charge and discharge efficiencies were found to be higher by about 10% than that of the battery of the comparison example 1. Also, the average operation voltages of the batteries in the experiment examples 11, 12 were 3.74V at the time of the 0.2 C discharge, however, that of the battery in the comparison example 1 was 3.45V at the time of the 0.2 C discharge. Thus, it was found that the experiment examples 11, 12 are superior in energy (voltage x current) to the comparison example 1. Also, from the comparison between this result and the result of the experiment examples 1, 2 in the table 1, even if the order of the lamination between the carbon layer and the Li absorbing layer was changed, it was indicated that the same performance can be obtained with regard to the initial charge and discharge efficiency and the average operation voltage.

EXPERIMENT EXAMPLE 13

This experiment example will be described below with reference to FIG. 10.

The copper foil of the thickness of 10 μm was used for the anode collector $1h$. As the anode material included in the Li absorbing layer $3h$, the particles (the average particle diameter of 1 μm) were used, the particles were formed by the mechanically milling method using an Ag particles and the carbon particles. The Li absorbing layer $3h$ of a thickness of 2 μm was formed by coating the material, in which the above-mentioned particles, the poly-vinylidene fluoride dissolved in the N-methyl-2-pyrrolidone, and the conductive additives were mixed into paste form, on the anode collector $1h$, and drying it.

The hard carbon of a thickness of 50 μm was used for the carbon layer $2h$. The carbon layer $2h$ was produced by coating the material, in which the hard carbon, the poly-vinylidene fluoride (binder) dissolved in the N-methyl-2-pyrrolidone, and the conductive additives were mixed into paste form, on the Li absorbing layer $3h$, and drying it. Moreover, the Li compensating layer $6h$ for compensating the irreversible capacity was deposited by 1 μm on the Li absorbing layer $3h$.

Also, the aluminum foil of the thickness of 20 μm was used as the cathode collector $14h$, and the $Li_{1.1}Mn_2O_4$ of a thickness of 100 μm was used for the cathode active material $15h$. The material in which the poly-propylene and the poly-ethylene were laminated in multilayer form was used for the separator $16h$, the material in which the $LiPF_6$ as the support salt was added to the mixture of EC/DEC=3:7 was used for the electrolyte. The battery was manufactured by using the above-mentioned materials, and the electrochemical property evaluation was executed.

EXPERIMENT EXAMPLE 14

This embodiment experiment example will be described below with reference to FIG. 10.

The copper foil of the thickness of 10 μm was used for the anode collector $1h$. As the anode material included in the Li absorbing layer $3h$, the particles (the average particle diameter of 1 μm) were used, the particles were alloy of Ge as the Li absorbing layer and Fe as the buffering material. The Li absorbing layer $3h$ of the thickness of 2 μm was formed by coating the material, in which the above-mentioned particles, the poly-vinylidene fluoride dissolved in the N-methyl-2-pyrrolidone, and the conductive additives were mixed into paste form, on the anode collector $1h$, and drying it.

The mixture of the graphite and the hard carbon of the thickness of 50 μm was used for the carbon layer $2h$. The carbon layer $2h$ was formed by coating the material, in which the mixture of the hard carbon and the graphite, the poly-vinylidene fluoride (binder) dissolved in the N-methyl-2-pyrrolidone, and the conductive additives were mixed into paste form, on the Li absorbing layer $3h$ and drying it. Moreover, the Li compensating layer $6h$ for compensating the irreversible capacity was deposited by 1 μm on the Li absorbing layer $3h$.

Also, the aluminum foil of the thickness of 20 μm was used as the cathode collector $14h$, and the $LiCoO_2$ of a thickness of 85 μm was used for the cathode active material $15h$. The material in which the poly-propylene and the poly-ethylene were laminated in multilayer form was used for the separator $16h$, the material in which the $LiPF_6$ as the support salt was added to the mixture of EC/DEC=3:7 was used for the electrolyte. The battery was manufactured by using the above-mentioned materials, and the electrochemical property evaluation was executed.

A table 6 shows the results when the initial charge and discharge efficiencies and average operation voltages in the experiment examples 13, 14 and comparison example 2 were evaluated.

TABLE 6

|  | Exp. ex. 13 | Exp. ex. 14 | Comparison ex. 2 |
|---|---|---|---|
| Initial change and discharge efficiency | 95% | 95% | 95% |
| Average operation voltage | 3.74 V | 3.74 V | 3.45 V |

As for the initial charge and discharge efficiency, since carrying out the Li compensation, all of the experiment examples 13, 14 and the comparison example 2 exhibited the high value of 95%. On the other hand, as for the average operation voltage, although the comparison example 2 having no carbon layer only exhibited 3.45V at the time of the 2 C discharge, the experiment examples 13, 14 exhibited 3.75V at the time of the 0.2 C discharge. From these facts, it was found that the batteries in the experiment examples 13, 14 are the battery superior in energy (voltage x current) because of the existence of the carbon layer $2h$.

EXPERIMENT EXAMPLE 15

This experiment example will be described below with reference to FIG. 11.

The copper foil of the thickness of 10 μm was used for the anode collector $1i$. As the anode material included in the Li absorbing layer $3i$, the particles (the average particle diameter of 1 μm) were used, the particles were alloy of Sn as the Li absorbing layer $4a$ and Cu as the buffering material $5a$. The Li absorbing layer $3i$ of the thickness of 2 μm was formed by coating the material, in which the above-mentioned particle, the poly-vinylidene fluoride dissolved in the N-methyl-2-pyrrolidone, and the conductive additives were mixed into paste form, on the anode collector $1i$, and drying it.

The graphite of the thickness of 60 μm was used for the carbon layer $2i$. The carbon layer $2i$ was formed by coating the material, in which the graphite, the poly-vinylidene fluoride (binder) dissolved in the N-methyl-2-pyrrolidone, and the conductive additives were mixed into paste form, on the Li absorbing layer $3i$ and drying it.

Next, the middle layer $7i$ of a thickness of 200 nm was formed by depositing the Sn on the Li absorbing layer $3i$. Moreover, the Li compensating layer $6i$ of a thickness of 1.5 μm was formed by depositing the Li, on the middle layer $7i$.

Also, the aluminum foil of the thickness of 20 μm was used as the cathode collector $14i$, and the $Li_{1.1}Mn_2O_4$ of a thickness of 100 μm was used for the cathode active material $15i$. The material in which the poly-propylene and the poly-ethylene were laminated in multilayer form was used for the separator $16I$, the material in which the $LiPF_6$ as the support salt was added to the mixture of EC/DEC=3:7 was used for the electrolyte. The battery was manufactured by using the above-mentioned materials, and the electrochemical property evaluation was executed.

EXPERIMENT EXAMPLE 16

This experiment example will be described below with reference to FIG. 11.

With reference to FIG. 11, the copper foil of the thickness of 10 μm was used for the anode collector 1i.

As the anode material included in the Li absorbing layer 3i, the particles (the average particle diameter of 1.5 μm) was used, the particles were produced by the mechanical alloy method using the mixture of the Si particles as the Li absorbing layer 4a and the Cu particles as the buffering material 5a. The Li absorbing layer 3i of a thickness of 3 μm was formed by coating the material, in which the above-mentioned particles, the poly-vinylidene fluoride dissolved in the N-methyl-2-pyrrolidone, and the conductive additives were mixed into paste form, on the anode collector 1i, and drying it.

The graphite of the thickness of 60 μm was used for the carbon layer 2i. The carbon layer 2i was formed by coating the material, in which the graphite, the poly-vinylidene fluoride (binder) dissolved in the N-methyl-2-pyrrolidone, and the conductive additives were mixed into paste form, on the Li absorbing layer 3i and drying it.

Next, the middle layer 7i of a thickness of 100 nm was formed by depositing the $Li_2O$—$SiO_2$ based compound on the Li absorbing layer 3i. Moreover, the Li compensating layer 6i of the thickness of 1.5 μm was formed by depositing the Li, on the middle layer 7i.

Also, the aluminum foil of the thickness of 20 μm was used as the cathode collector 14i, and the $Li_{1.1}Mn_2O_4$ of a thickness of 115 μm was used for the cathode active material 15i. The material in which the poly-propylene and the poly-ethylene were laminated in multilayer form was used for the separator 16I, the material in which the $LiPF_6$ as the support salt was added to the mixture of EC/DEC=3:7 was used for the electrolyte. The battery was manufactured by using the above-mentioned materials, and the electrochemical property evaluation was executed.

EXPERIMENT EXAMPLE 17

This embodiment experiment example will be described below with reference to FIG. 11.

The copper foil of the thickness of 10 μm was used for the anode collector 1i. As the anode material included in the Li absorbing layer 3i, the particles (the average particle diameter of 1.5 μm) were used, the particles were produced by the sputtering method by using Si as the Li absorbing material 4a and Fe as the buffering material 5a. The Li absorbing layer 3i of a thickness of 3 μm was formed by coating the material, in which the above-mentioned particles, the poly-vinylidene fluoride dissolved in the N-methyl-2-pyrrolidone, and the conductive additives were mixed into paste form, on the anode collector 1i, and drying it.

The hard carbon of a thickness of 60 μm was used for the carbon layer 2i. The carbon layer 2i was produced by coating the material, in which the hard carbon, the poly-vinylidene fluoride (binder) dissolved in the N-methyl-2-pyrrolidone, and the conductive additives were mixed into paste form, on the Li absorbing layer 3i, and drying it.

Next, the middle layer 7i of a thickness of 120 nm was formed by depositing the $Li_2O$—$P_2O_5$—$SiO_2$ based compound on the Li absorbing layer 3i. Moreover, the Li compensating layer 6i of a thickness of 1 μm was formed by depositing the LiF, on the middle layer 7i.

Also, the aluminum foil of the thickness of 20 μm was used as the cathode collector 14i, and the $Li_{1.1}Mn_2O_4$ of the thickness of 115 μm was used for the cathode active material 15i. The material in which the poly-propylene and the poly-ethylene were laminated in multilayer form was used for the separator 16I, the material in which the $LiPF_6$ as the support salt was added to the mixture of EC/DEC=3:7 was used for the electrolyte. The battery was manufactured by using the above-mentioned materials, and the electrochemical property evaluation was executed.

The initial charge and discharge efficiencies, the average operation voltages and the capacity maintaining rates after 300 cycles were evaluated for the batteries in the experiment examples 15 to 17 and the comparison example 3. A table 7 shows its result.

TABLE 7

|  | Exp. ex. 15 | Exp. ex. 16 | Exp. ex. 17 | Comparison ex. 3 |
|---|---|---|---|---|
| Initial charge and discharge efficiency | 99% | 98% | 98% | 98% |
| Average operation voltage | 3.75 V | 3.75 V | 3.75 V | 3.45 V |
| Capacity maintaining rate (after 300 cycles) | 84% | 82% | 83% | 52% |

With regard to the initial charge and discharge efficiency, all of the batteries in the experiment examples 15 to 17 exhibited the high values of 98% or more. The reason why they exhibited the higher values than those of the initial charge and discharge efficiencies (the table 6) of the batteries in the experiment examples 13, 14 having no middle layer was considered that the middle layer 7i contributed to the smooth Li compensation to the anode active material from the Li compensating layer 6e.

Also, the average operation voltage was 3.75V at the time of the 0.2 C discharge in the experiment examples 15 to 17, however, it was 3.45V in the comparison example 3. Thus, it was found that the configuration having the carbon layer 2i is superior in energy (voltage x current).

Also, although the capacity maintaining rate after 300 cycles was 52% in the comparison example 3, the experiment examples 15 to 17 exhibited the excellent result of 80% or more. Thus, it was found that the using of the configuration having the carbon layer 2i improves the cycle property.

As mentioned above, according to the present invention, since the anode has the particular configuration, it is possible to provide the anode for the secondary battery which functions at the high operation voltage and exhibits the stable operation and the long life, and to provide the secondary battery of the same.

The invention claimed is:

1. An anode for a secondary battery comprising:
   an anode active material layer which absorbs and discharges lithium ions, said anode active material layer comprising:
   a first layer comprising carbon as a chief ingredient; and
   a second layer comprising:
     at least one first element having a theoretical capacity greater than a theoretical capacity of graphite; and
     at least one second element which has a theoretical capacity equal to or less than the theoretical capacity of graphite, wherein said second layer includes particles, and said particles include said first element and said second element.

2. The anode for the secondary battery according to claim 1, wherein surfaces of said particles including said first element are coated with said second element.

3. The anode for the secondary battery according to claim 1, wherein surfaces of said particles including said second element are coated with said first element.

4. The anode for the secondary battery according to claim 1, wherein said particles are formed by any of a CVD method, a deposition method, a sputtering method, a mechanical milling method and a mechanical alloy method.

5. The anode for the secondary battery according to claim 1, wherein said second element comprises at least one element selected from the group consisting of C, Fe and Cu.

6. The anode for the secondary battery according to claim 1, wherein said first element comprises at least one element selected from the group consisting of Si, Ge, Sn, Al, Pb, Pd, Ag, In and Cd.

7. The anode for the secondary battery according to claim 1, further comprising:
a layer comprising Li or a Li compound.

8. The anode for the secondary battery according to claim 7, wherein said Li compound includes LiF or $Li_2O$.

9. The anode for the secondary battery according to claim 5, wherein said first element comprises at least one element selected from the group consisting of Si, Ge, Sn, Al, Pb, Pd, Ag, In and Cd.

10. The anode for the secondary battery according to claim 9, further comprising:
a layer comprising Li or a Li compound.

11. The anode for the secondary battery according to claim 10, wherein said Li compound includes LiF or $Li_2O$.

12. The anode for the secondary battery according to claim 1, further comprising a third layer comprising Li or Li compound.

13. The anode for the secondary battery according to claim 12, wherein said Li compound comprises LiF or $Li_2O$.

14. The anode for the secondary battery according to claim 12, further comprising a fourth layer comprising a lithium ion conductive property.

15. The anode for the secondary battery according to claim 14, wherein said fourth layer is formed between said first layer and said third layer.

16. The anode for the secondary battery according to claim 14, wherein said fourth layer comprises materials selected from the group consisting of Si, Sn, DLC, a $Li_2O$—$SiO_2$ based compound, a $Li_2O$—$B_2O_3$—$SiO_2$ based compound, a $Li_2O$—$B_2O_3$—$P_2O_5$ based compound, a $Li_2O$—$WO_3$ based compound, $Li_2O$—$P_2O_5$—$SiO_2$ based compound, and a $Li_2O$—$B_2O_3$ based compound.

17. The anode for the secondary battery according to claim 1, wherein a volume A of said at least one first element and a volume B of said at least one second element satisfy $0.001 \leq B/(A+B) \leq 0.5$.

18. The anode for the secondary battery according to claim 1, further comprising a collector placed adjacent to said first layer.

19. The anode for the secondary battery according to claim 1, further comprising a collector placed adjacent to said second layer.

* * * * *